US009147288B1

(12) United States Patent
Johnston et al.

(10) Patent No.: US 9,147,288 B1
(45) Date of Patent: Sep. 29, 2015

(54) SUBDIVISION OF SURFACES APPROXIMATION

(75) Inventors: Eric R. Johnston, San Francisco, CA (US); Philip R. Peterson, Petaluma, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1890 days.

(21) Appl. No.: 11/557,763

(22) Filed: Nov. 8, 2006

(51) Int. Cl.
| G06T 19/00 | (2011.01) |
| G06T 17/00 | (2006.01) |
| G06T 17/20 | (2006.01) |
| G06T 17/30 | (2006.01) |
| G06T 19/20 | (2011.01) |

(52) U.S. Cl.
CPC ............... *G06T 19/00* (2013.01); *G06T 17/00* (2013.01); *G06T 17/20* (2013.01); *G06T 17/205* (2013.01); *G06T 17/30* (2013.01); *G06T 19/20* (2013.01); *G06T 2210/36* (2013.01); *G06T 2219/2021* (2013.01)

(58) Field of Classification Search
USPC .................................................. 345/423, 428
See application file for complete search history.

(56) References Cited

U.S. PATENT DOCUMENTS

| 3,889,107 | A | | 6/1975 | Sutherland |
| 5,774,130 | A | * | 6/1998 | Horikawa et al. ............. 345/441 |
| 6,057,848 | A | * | 5/2000 | Goel ............................. 345/423 |
| 6,356,263 | B2 | | 3/2002 | Migdal et al. |
| 6,396,492 | B1 | | 5/2002 | Frisken et al. |
| 6,462,738 | B1 | * | 10/2002 | Kato ............................. 345/428 |
| 6,525,727 | B1 | * | 2/2003 | Junkins et al. ................. 345/423 |
| 6,989,830 | B2 | | 1/2006 | Stollnitz et al. |
| 7,027,045 | B2 | * | 4/2006 | Perry et al. .................... 345/419 |
| 7,446,777 | B2 | | 11/2008 | Breneman |
| 7,671,860 | B2 | | 3/2010 | Guenter |
| 2004/0143426 | A1 | | 7/2004 | Stewart et al. |

OTHER PUBLICATIONS

Fredrik Andersson, "Bezier and B-Spline Technology", Jun. 11, 2003, Thesis.*
Catmull and Clark, "Recursively generated B-spline surfaces on arbitrary topological surfaces," *Computer-Aided Design*, 1978, 10(6):350-355.
Peters, "Patching Catmull-Clark Meshes," *SIGGRAPH*, 2000, p. 257.
Hoppe et al., "Piecewise smooth surface reconstruction," *Proceedings of the 21st Annual Conference on Computer Graphics and interactive Techniques SIGGRAPH '94*, 1994, ACM Press, New York, NY, pp. 295-302.

(Continued)

*Primary Examiner* — Ulka Chauhan
*Assistant Examiner* — Robert Bader
(74) *Attorney, Agent, or Firm* — Kilpatrick Townsend & Stockton LLP

(57) ABSTRACT

This document describes systems and techniques for representing computer-generated objects with a limit mesh. In general, the systems and techniques may generate an object's form or appearance based on an estimation of how the object would look if shapes that form the object were infinitely subdivided to create a smooth surface for the object. For example, when a user views a distance object in a video game, its shape can be estimated by calculating an approximation of what the object would look like if the polygons that make up the object were infinitely divided. As the user approaches the object, curving solutions that may be embedded in the object can be used to construct curves for the object so that it appears smooth.

16 Claims, 13 Drawing Sheets

(56) References Cited

OTHER PUBLICATIONS

Halstead et al., "Efficient, fair interpolation using Catmull-Clark surfaces," *Proceedings of the 20th Annual Conference on Computer Graphics and interactive Techniques SIGGRAPH '93*, 1993, ACM Press, New York, NY, 35-44.

Biermann et al., "Piecewise smooth subdivision surfaces with normal control," *Proceedings of the 27th Annual Conference on Computer Graphics and Interactive Techniques International Conference on Computer Graphics and Interactive Techniques*, 2000, ACM Press/Addison-Wesley Publishing Co., New York, NY, 113-120.

Krivanek et al., "Adaptive Mesh Subdivision for Precomputed Radiance Transfer," *2004 Proceedings of Spring Conference on Computer Graphics*, SCCG, 2004.

Rappoport, "Rendering Curves and surfaces with Hybrid Subdivision and forward Differencing," *ACM Transactions on Graphics*, 1991, 10(4):323-341.

Cheng, "Estimating Subdivision depths for rational Curves and Surfaces," *ACM Transactions on Graphics*, 1992, 11(2):140-151.

Velho et al., "A Unified Approach for Hierachical Adaptive Tesselation of Surfaces," *ACM Transactions on Graphics*, 1999, 18(4):329-360.

\* cited by examiner

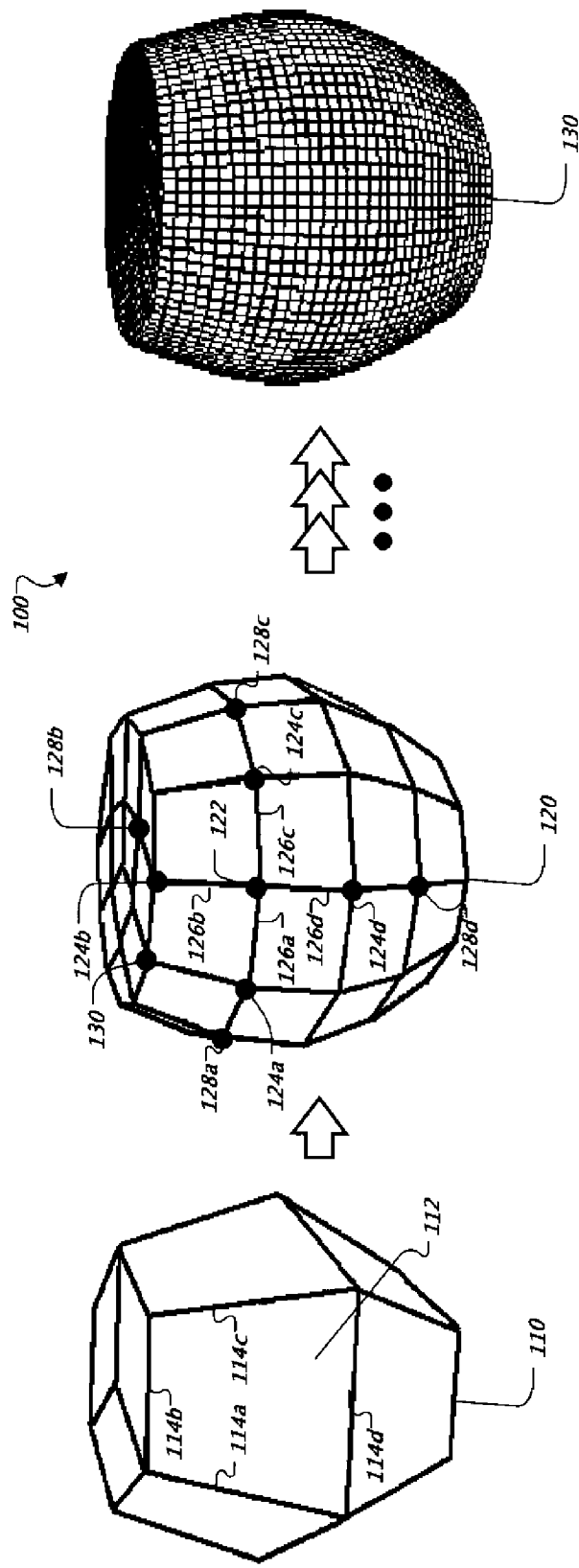

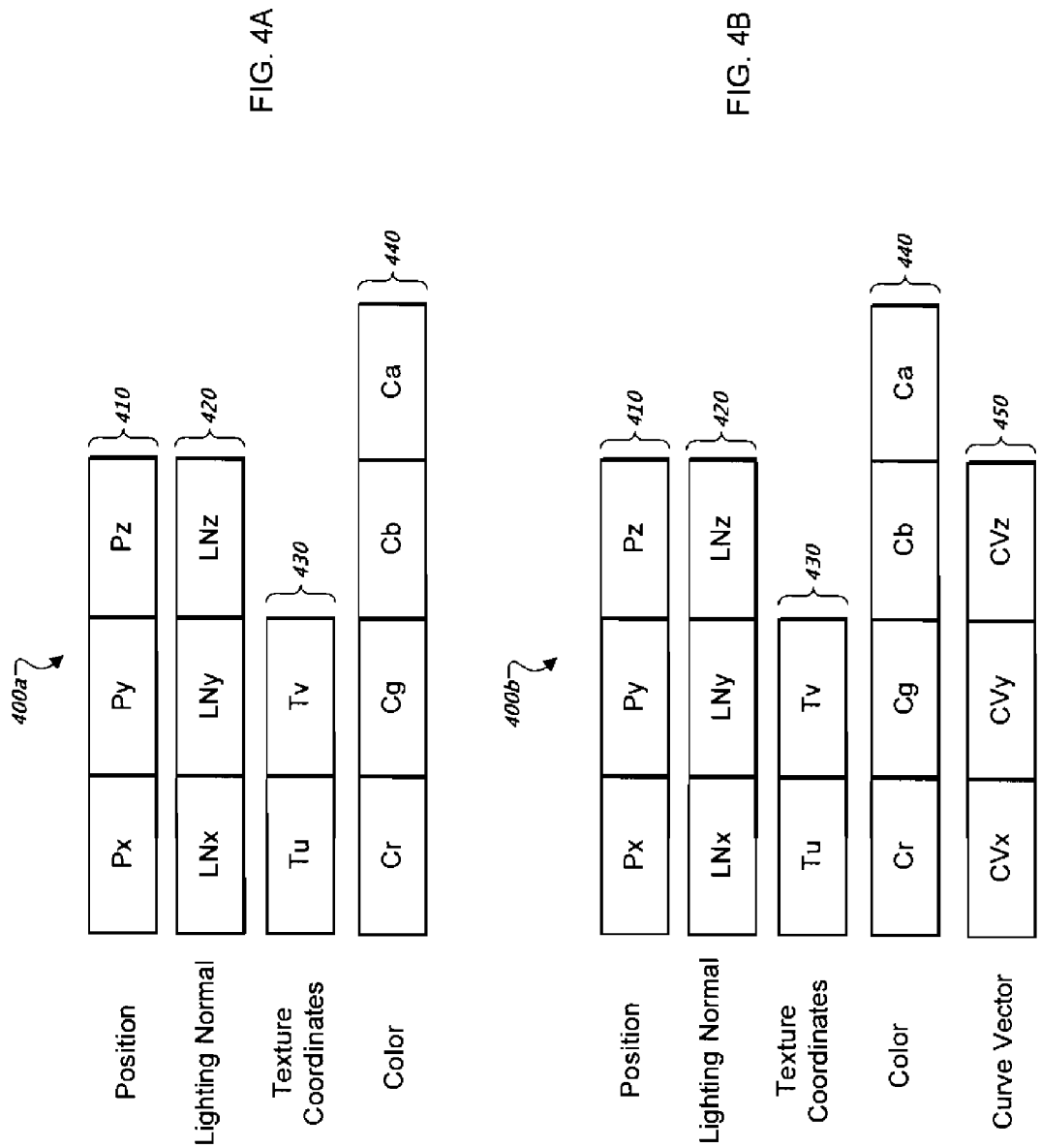

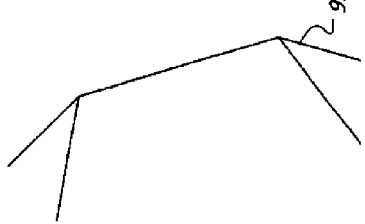
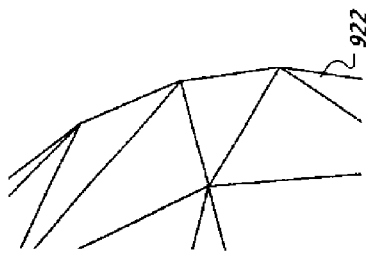
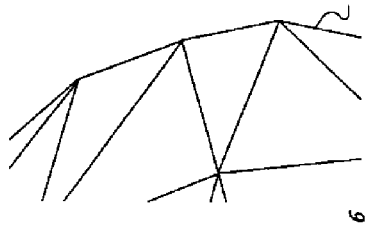
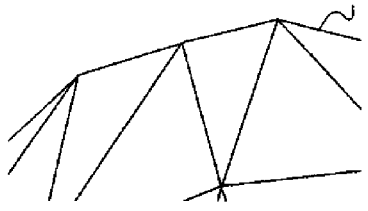
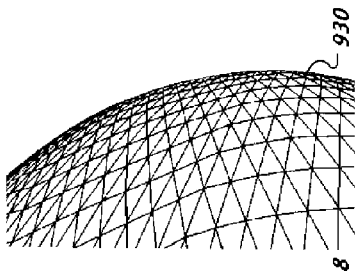
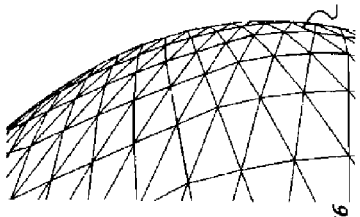
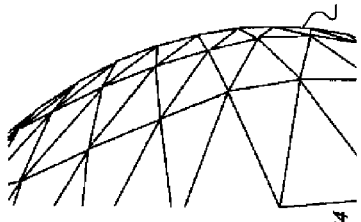
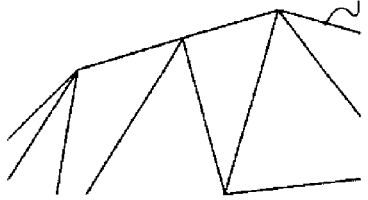
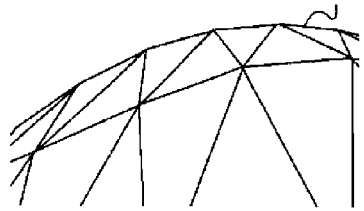
FIG. 9B
FIG. 9C
FIG. 9D

SUBDIVISION OF SURFACES APPROXIMATION

TECHNICAL FIELD

This instant specification relates to computer rendering, and, more particularly, to approximating a subdivision of an object surface.

BACKGROUND

Many video game systems display computer-generated objects to a player during game play. In some systems, the objects are constructed using a mesh of polygons, where the mesh is shaped to approximate an object to be displayed. For example, a sphere may consist of a generally round mesh of polygons. However, because the polygons in the mesh are not curved, the sphere appears to have a "blocky" surface instead of a smooth spherical surface.

In certain systems, the blocky appearance can be reduced by subdividing the surface of the mesh to increase the number of polygons so that the transition between the polygons is more difficult to visually perceive.

FIG. 1A is a schematic diagram illustrating an example technique 100 for generating subdivision surfaces. The general process of generating subdivision surfaces is one by which a subdivision equation is repeatedly applied to an original mesh 110, each time producing a more refined result. Certain systems use an algorithm for subdividing surfaces that is described in Catmull, Edwin and Clark, Jim. "Recursively generated B-spline surfaces on arbitrary topological surfaces", *Computer-Aided Design*, 10(6) (1978):350-355, the entirety of which is incorporated by reference herewithin.

As described, the algorithm places a new vertex at the center of each original face, positioned as the average of the positions of the face's original vertices. New edge points are similarly placed at the center of each original edge, positioned at the calculated average of the center point of the original edge and the average of the locations of the two new adjacent face points. New edges are added to connect the new edge points to the new adjacent face points. As new face vertices and edge points are calculated, old (i.e., original) vertices are also moved in space to create higher resolution meshes. The old vertices P are repositioned to P' according to the equation $P'=Q/n+2\times R/n+S\times(n-3)/n$, where Q is the average of the new face points surrounding the old vertex, R is the average of the midpoints of the edges that share the old vertex, S is the old vertex point, and n is the number of edges that share the old vertex.

For example, the Catmull-Clark Subdivision Surfaces algorithm can use an original mesh 110 and add a new vertex point 122 to the original face 112. New edge points 124*a*, 124*b*, 124*c*, and 124*d* can also be added to the edges 114*a*, 114*b*, 114*c*, and 114*d*, respectively by calculating an average between each point and the point's respective adjacent face point 128*a*, 128*b*, 128*c*, and 128*d*. The new vertex point 122 and new edge points 124*a*, 124*b*, 124*c*, and 124*d*, can be used as end points for the new edges 126*a*, 126*b*, 126*c*, and 126*d*.

After one iteration of the algorithm, for example, the steps of calculating new edge points, new face points, and new edges can be done for each face and edge of the original mesh 110 generating a first subdivision surface mesh 120. The algorithm can be applied repeatedly generating an example mesh 130 on the fourth iteration of the subdivision surface algorithm using the same approach as described above. As the number of iterations approaches infinity, the divided mesh approaches a limit surface. However, this algorithm can be computationally expensive and may be difficult to accomplish in real-time.

SUMMARY

This document describes systems and techniques for representing computer-generated objects with a limit mesh. In general, the systems and techniques may generate an object's form or appearance based on an estimation of how the object would look if shapes that form the object were infinitely subdivided to create a smooth surface for the object. For example, when a user views a distance object in a video game, its shape can be estimated by calculating an approximation of what the object would look like if the polygons that make up the object were infinitely divided. As the user approaches the object, curving solutions that may be embedded in the object can be used to construct curves for the object so that it appears smooth.

The systems and techniques described here may provide one or more of the following advantages. First, a system can decrease the computational resources needed to accurately represent a computer-generated object to a viewer. Second, a system can smoothly transition an object representation as a virtual camera moves closer to the object representation. Third, a system can avoid storing polygons generated by subdivision algorithms, and thus increase the system's performance. Fourth, a system can increase the quality of an object's appearance by associating normals with the limit mesh that correspond to normals associated with a limit surface. Fifth, a system may quickly calculate curvature solutions using curvature information associated with the object being represented. Sixth, a system can generate a limit mesh to represent an object, where the limit mesh has substantially the same number of polygons an original mesh used to generate the limit mesh. Seventh, a system can reduce the "polygonal," or blocky, look of objects when rendered in real time animation (e.g., video games).

The details of one or more embodiments of the subdivision of surfaces approximation feature are set forth in the accompanying drawings and the description below. Other features and advantages of the subdivision of surfaces approximation feature will be apparent from the description and drawings, and from the claims.

DESCRIPTION OF DRAWINGS

FIG. 1A is a schematic diagram illustrating an example technique for generating subdivision surfaces.

FIG. 4A is a block diagram illustrating exported model information.

FIG. 4B is a block diagram illustrating exported model information with curve information.

FIG. 9B is a schematic diagram illustrating an example low detail representation of an object.

FIG. 9C is a schematic diagram illustrating an example transition between intermediate resolutions using a curve flattening technique.

FIG. 9D is a schematic diagram illustrating an example transition between high resolutions using increasing levels of resolution in the curve information.

Like reference symbols in the various drawings indicate like elements.

DETAILED DESCRIPTION

This document describes systems and techniques for real-time approximations of a limit surface with smooth transitions between various levels of detail of the approximations. The approximations can be defined using a system (e.g., the system described in FIG. 7) that determines a limit mesh with the same number of geometric shapes as the original mesh. A curve solution can also be applied to the limit mesh to improve the detail of the approximations. Both the limit mesh and the curve solution can be used during run-time execution of a game to provide transitions between detail levels as a game camera is moved within the game environment.

For example, if a user has a camera positioned at a distant location from an object (e.g., a head portion of a character model), the object can be displayed with sharp edges (e.g., the head can be represented using a cube-shaped object). At a distance, the sharp edges of the object may not be perceptible to a viewer. If the sharp edged object was viewed at a zoomed in level of detail, the sharp edges would give the object a blocky appearance. However, in some implementations, the blocky appearance is not seen by the user because as the camera is moved closer to the object, the edges are softened and eventually replaced with curves, giving it a more nuanced appearance (e.g., the edges of a cube can be smoothed so that a spherical object appears rounded). The transitions may be imperceptible to the user because the distances and differing levels of detail involved may permit seamless transitions between levels of detail, as described herein.

Figure 1B:
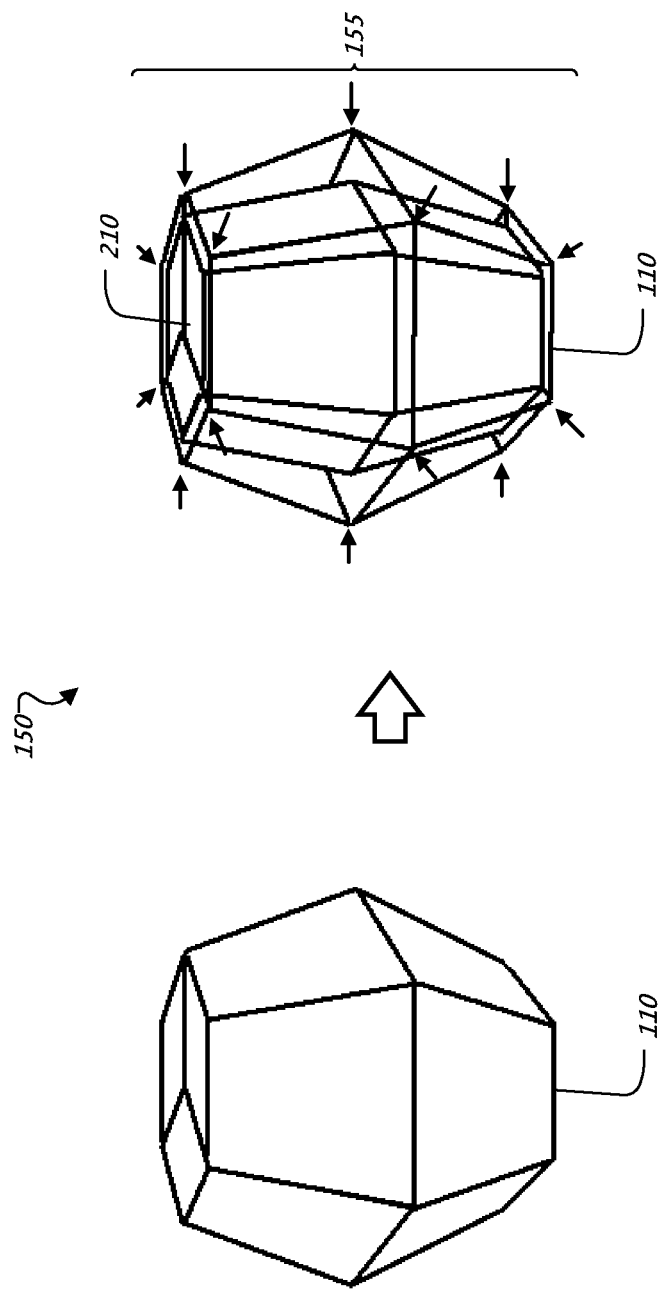
FIG. 1B is a schematic diagram illustrating an example technique for calculating the limit surface position.

FIG. 1B is a schematic diagram illustrating an example technique 150 for calculating the limit surface position. Instead of using the previously described subdivision technique, a limit surface approximation can be calculated without subdivision surfaces. The algorithm can use weighted averages to determine the location of the limit position for each of the vertices in the original mesh. Suitable algorithms for calculating a limit surface include algorithms described in Peters, Jorg, "Patching Catmull-Clark Meshes," SIGGRAPH (2000): 257, the entirety of which is incorporated herewithin.

As described, the number of crease edges for an object is determined. A crease edge can be defined as an edge used in the construction of two or more faces whose surface normals differ by more than some threshold. If the object does not include a creased edge the weighted average of the limit surface vertex position (LSP) can be calculated as $$LSP = \frac{(n \times n)V + 4\sum_{j=0}^{J} VN_j + \sum_{k=0}^{K} DAV_k}{n(n+5)}$$

where n is a number of faces sharing a vertex, V is a position of the vertex in the original mesh, VN is a position of a neighboring vertex to the vertex, J is the number of neighboring vertices, DAV is a position of a diagonal across-a-face vertex from the vertex, and K is a number of diagonal across-a-face vertices.

If the object includes a creased edge, the number of creased edges per vertex is calculated and is used in the determination of the limit surface position. If the vertex has zero creased edges, it is consider a "smooth" vertex. If the vertex has one crease edge, it is considered a "dart" vertex. If a vertex has two crease edges, it is considered a "crease" vertex. If a vertex has three or more crease edges, it is considered a "corner" vertex. If a vertex is a "smooth" or "dart" vertex, the position can be calculated as described above.

If the vertex is a "crease" vertex, the new position of the limit surface can be calculated as $$LSP = \frac{2}{3}V + \frac{1}{6}(VC_0 + VC_1)$$

where V is the position of the "crease" vertex, $VC_0$ is the position of a the vertex at the end of the first crease edge connected to V, and $VC_1$ is the position of a the vertex at the end of the other crease edge connected to V. If a vertex is a "corner" vertex, the new position of the vertex is the corresponding point on the limit surface (i.e., the identity). In certain implementations, the crease vertices are defined using methods and equations as described in Hoppe, H., DeRose, T., Duchamp, T., Halstead, M., Jin, H., McDonald, J., Schweitzer, J., and Stuetzle, W. 1994. "Piecewise smooth surface reconstruction." Proceedings of the 21st Annual Conference on Computer Graphics and interactive Techniques SIGGRAPH '94. ACM Press, New York, N.Y., 295-302, the entirety of which is included herewithin.

For example, referring back to FIG. 1A, the first subdivision mesh 120 contains a "smooth" vertex 122 because the adjacent faces have similar surface normals. Vertex 124b is a "crease" vertex because it shares edges with two other vertices whose adjacent faces' surface normals have a greater change than a specified threshold. Vertex 130 is a "corner" vertex because it shares edges with three other vertices whose adjacent faces' surface normals have a greater change than a specified threshold.

For example, using the previously described approach, the original mesh 110 can be used to calculate the limit mesh 210 whereby the original mesh's vertices are moved (as represented by the set of arrows 155) into a position on the determined limit surface. The newly positioned vertices can define the limit mesh 210.

Figure 2:
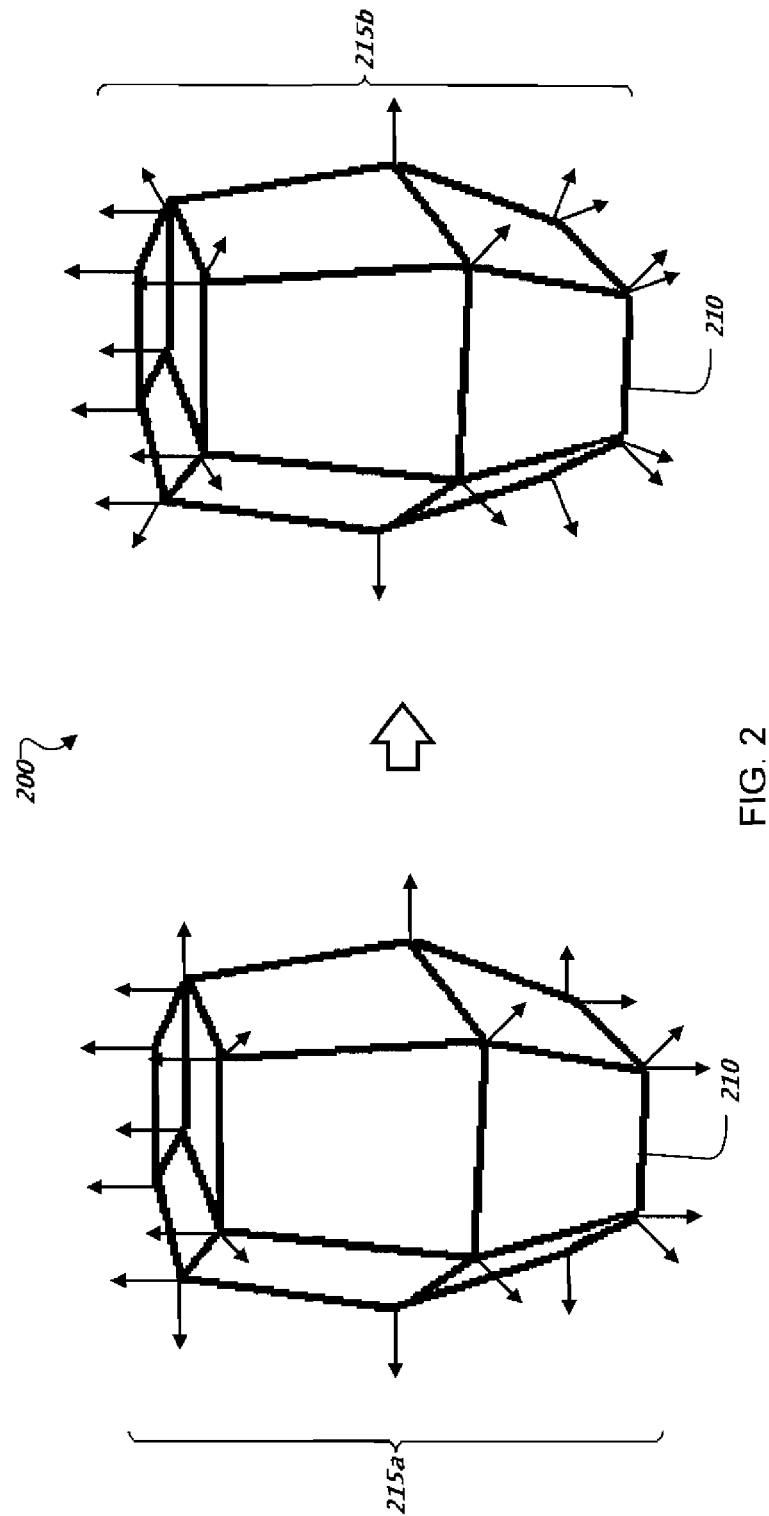
FIG. 2 is a schematic diagram illustrating an example technique for limit surface normal evaluation.

FIG. 2 is a schematic diagram illustrating an example technique 200 for limit surface normal evaluation. Normal vectors are directional vectors used to determine the effects of lights and other influences on an object. For example the mesh 210 includes a set of vectors 215a obtained from the original mesh 110 which can determine how a light from a light source (e.g., a simulated torch, ambient light, or the like) reflects off of a virtual object.

The normal vectors of the original mesh 110 may differ slightly from the normal vectors of the infinitely subdivided surface (e.g., the limit surface). Adjusting the normal vectors so that they approximate the vectors of the infinitely subdivided surface can increase the visual quality of the result.

Once the limit mesh 210 has been generated using previously described techniques (e.g., technique 150), limit-surface normal equations are applied which result in adjustments to the surface normals. The adjustments to the normals can induce changes to the lighting of the object. One suitable limit-surface normal equation is described in Halstead, M., Kass, M., and DeRose, T. 1993, "Efficient, fair interpolation using Catmull-Clark surfaces." Proceedings of the 20th Annual Conference on Computer Graphics and interactive Techniques SIGGRAPH '93. ACM Press, New York, N.Y., 35-44, the entirety of which is incorporated herewithin.

As described, the equation uses eigen-analysis on a subdivision matrix. A subdivision matrix can be constructed for each vertex. The subdivision matrix includes a vertex and the other vertices that influence the vertex. The eigen-analysis returns right eigenvectors and left eigenvectors. The first left eigenvector when combined using a dot product with the vertices computes the limit position, the second and third left eigenvectors combined using a dot product with the vertices compute two vectors that define the tangent plane at the limit position. Thus, by computing the 2nd and 3rd left eigenvectors and taking their cross product, the limit normal can be determined.

For example, the limit mesh 210 now includes a modified set of surface normal vectors 215b. Generally, the change in vectors is substantially small, however, the changes represented in FIG. 2 are exaggerated for illustrative purposes. In some certain situations, even substantially small changes in surface normal vectors can have a significant affect on how a user perceives an object in an environment, as the human eye is able to distinguish small changes in lighting.

In certain implementations, the equations involved in limit and normal computation—including accounting for creases—are described in Biermann, H., Levin, A., and Zorin, D. 2000, "Piecewise smooth subdivision surfaces with normal control" Proceedings of the 27th Annual Conference on Computer Graphics and Interactive Techniques International Conference on Computer Graphics and Interactive Techniques, ACM Press/Addison-Wesley Publishing Co., New York, N.Y., 113-120, the entirety of which is incorporated herewithin.

Figure 3B:
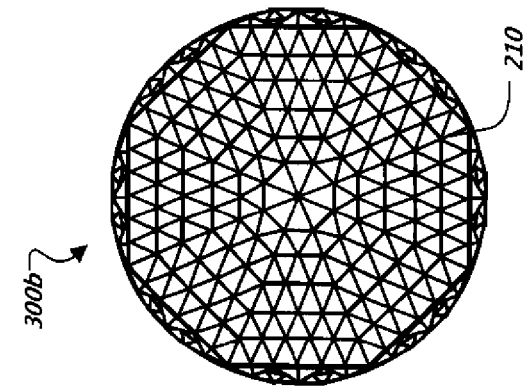
FIG. 3B is a schematic diagram illustrating another example curve solution.
Figure 3C:
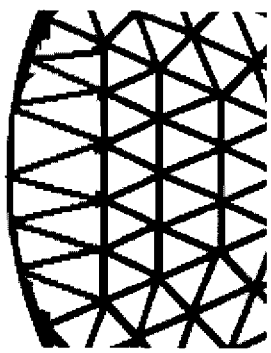
FIG. 3C is a schematic diagram illustrating another example curve solution.
Figure 3A:
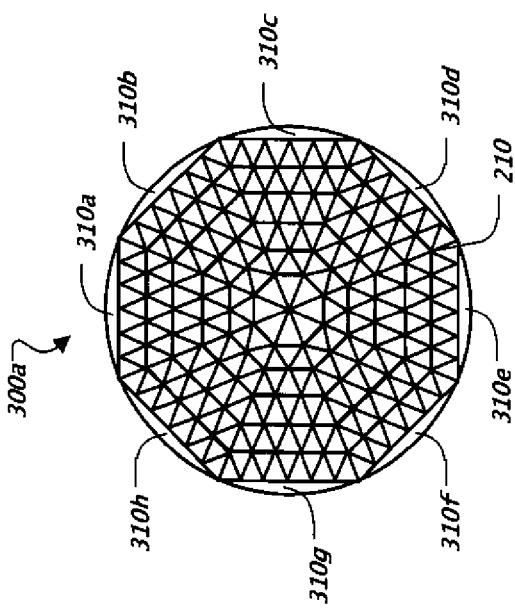
FIG. 3A is a schematic diagram illustrating an example curve solution.

FIG. 3A is a schematic diagram illustrating an example curve solution 300a. An artist can select curve solutions for application to the limit mesh 210 to produce an approximation of the subdivision surface. The artist can select a curve solution in a 3D modeling application, or can leave it as the automatically selected default determined by the same 3D modeling application.

The curve solution can be selected based on a variety of determining factors. For instance, in certain situations, the accuracy of the approximation can be a determining factor, while in other situations, the curving solution can be selected based on which curve solution is faster to compute. For example, if computational speed is of primary importance, curve solution 300a may be selected by the artist even though there are perceptible gaps 310a-310h because it can be quickly computed during run-time.

FIG. 3B is a schematic diagram illustrating another example curve solution 300b. As described previously, an artist's selection of curve solutions can vary from one object to another or from one situation to another. For example, if accuracy of object approximation is of primary importance to the artist, curve solution 300b may be applied to the limit 210 because it fills in the gaps 310a-310h, although it may take longer to compute during run-time than the solution 300a.

In another example, shown in FIG. 3C, the gaps 310a-310h can be filled by moving the existing polygons to fill the space instead to generating new polygons to fill the space, as shown in FIG. 3B. In this case, the system only modifies the curve solution instead of modifying the tessellation pattern used to approximate the object. Additionally, certain implementations can use a combination of generating new polygons and moving existing polygons to fill the space.

FIG. 4A is a block diagram illustrating exported model information 400a. In certain implementations, models rendered in a computer game environment are based on information (e.g., a file) exported from the 3D modeling application. A rendering engine can process this information to generate the rendered models. For example the exported information can include position information that defines the model (e.g., vertex coordinates for a mesh) the lighting normal information for the objects (e.g., a description of how light reflects from the object), texture coordinates 430, and color values 440 for the model.

FIG. 4B is a block diagram illustrating exported model information 440b which also includes curve information. As described previously, an artist can specify a curve solution for the limit mesh 210 by either selecting a curve solution or using the automatically selected default curve solution. In one implementation, information used to calculate the curve solution is exported so that it can be applied to the limit mesh 210 during run-time. As described previously the exported information can include position information 410, a lighting normal 420, texture coordinates 430, and color values 440. Additionally, the exported information can include a curve vector 450. In some implementations, the information in the curve vector depends on the curve solution chosen by the artist. Although depicted as a single 3-element vector for purposes of illustration, the curve vector can include more or fewer values depending on the curving solution selected by the artist. For example, the curving solution may contain a matrix of values, each of which represent a dimensional position for the curve at a point in the object.

The curve solution can be used by a game engine to apply a curve to the limit mesh as the in-game camera changes positions. For example, as the camera is moved closer to an object, the curve solution can be refined. Effects of the curving solution are described in more detail in connection with FIGS. 9A-9D.

Figure 5:
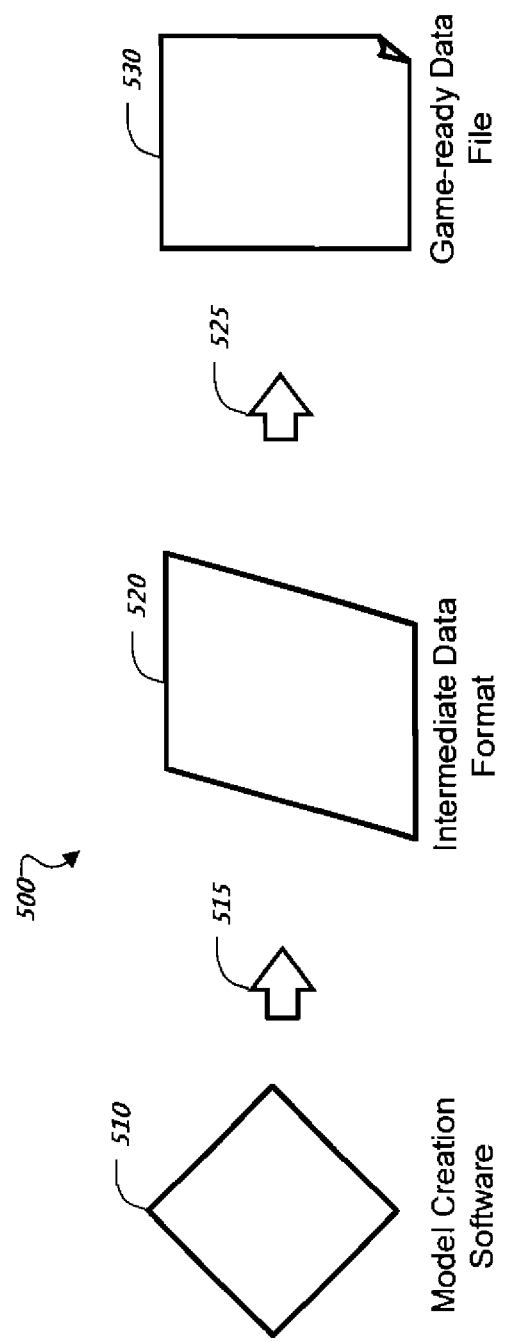
FIG. 5 is a block diagram illustrating an example for generating game-ready run-time file information.

FIG. 5 is a block diagram illustrating an example 500 for generating game-ready run-time file information. As previously described, an artist can use the 3D modeling application 510 to create a limit mesh for an object in the game. The limit mesh, along with extra information related to the chosen curve solution, is exported 515 into a format 520, which can be converted 525 into a platform specific format 530. The platform specific format 530 can be used by a game engine to apply the curve solution to the mesh. For example, the format 530 for objects may differ if defined for a gaming system developed by SONY (Tokyo, Japan), when compared to the format 530 of the same objects defined for a gaming system developed by MICROSOFT (Redmond, Wash.).

Figure 6:
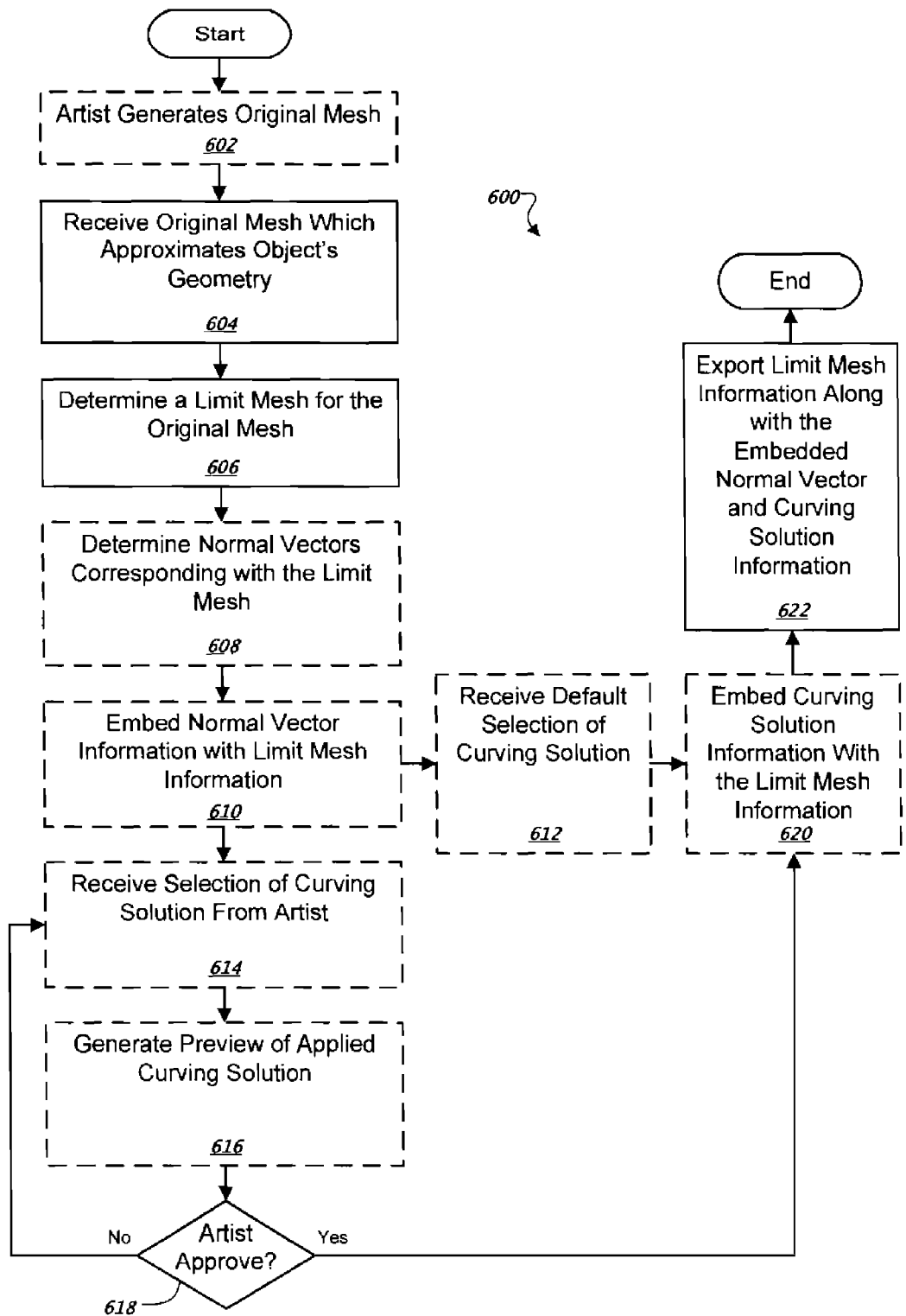
FIG. 6 is a flow chart illustrating an example method for generating a game-ready run-time file.

FIG. 6 is a flow chart illustrating an example method 600 for generating a run-time file for use by a game engine. The method can be implemented by, for example, the system described in connection with FIG. 7. At box 602, the artist can optionally generate an original mesh, or the artist can load a mesh that has been previously generated.

At box 604, the system receives the original mesh, which approximates an object's geometry in a computer game environment. For example, the mesh can include a set of polygons which define a 3-dimensional shape of the object.

At box 606, the system determines a limit mesh for the original mesh. For example, the original mesh can be processed by an algorithm that calculates the limit mesh, as described in connection with FIG. 1B.

At box 608, the system can optionally determine normal vectors corresponding with the limit mesh. For example, the system can use an algorithm described in association with FIG. 2, to modify normal vectors of the original mesh to determine normal vectors that correspond with the limit mesh.

At box 610, the system can optionally embed the normal vector information determined in box 608 with the limit mesh information determined in box 606. The information may be embedded in a format substantially similar to the format described in connection with FIG. 4A.

At box 612, the system can optionally receive a default selection of the curving solution. The default selection can be automatically generated by the system, and can be used to improve the approximation of the limit mesh, as described in connection with FIGS. 3A and 3B.

At box 614, the system can receive a selection of a curving solution by the artist. As described in connection with FIGS. 3A and 3B, the selection can be made based various determining factors.

At box 616, the system can generate a preview of the applied curving solution to the limit mesh. The preview can be used by the artist to determine if the curving solution satisfies the determining factors for the curving solution. For example, the artist may use the preview to determine whether or not the curving solution is accurate, or if the curve solution is computationally efficient.

At step 618, the system can receive input from the artist that indicates if the artist approves of the currently selected curving solution. If the artist does not approve, the system can receive a new selection, as previously described in box 614. Otherwise, the selected curving solution can be used in subsequent steps of the method 600.

At box 620, the system can optionally embed the curving solution information with the limit mesh information. The curving solution can be the automatically generated default curving solution, or the curving solution selected and approved by the artist. For example, the curving solution can be represented by one or more curving vectors a game engine can use to compute the curving solution.

At box 622, the system can export the limit mesh information along with the embedded normal vector information and the curving solution information. The embedded information can be exported in a format generally similar to the format described in connection with FIG. 4B. The information used to define an object may first be exported to an intermediate format before being converted into a platform specific format. In some implementations, the artist may select the type of platform on which the object will be rendered. After the platform selection, the system selects a previously defined converter corresponding to that platform and converts the intermediate format into a format accessible by the specified platform.

Figure 7:
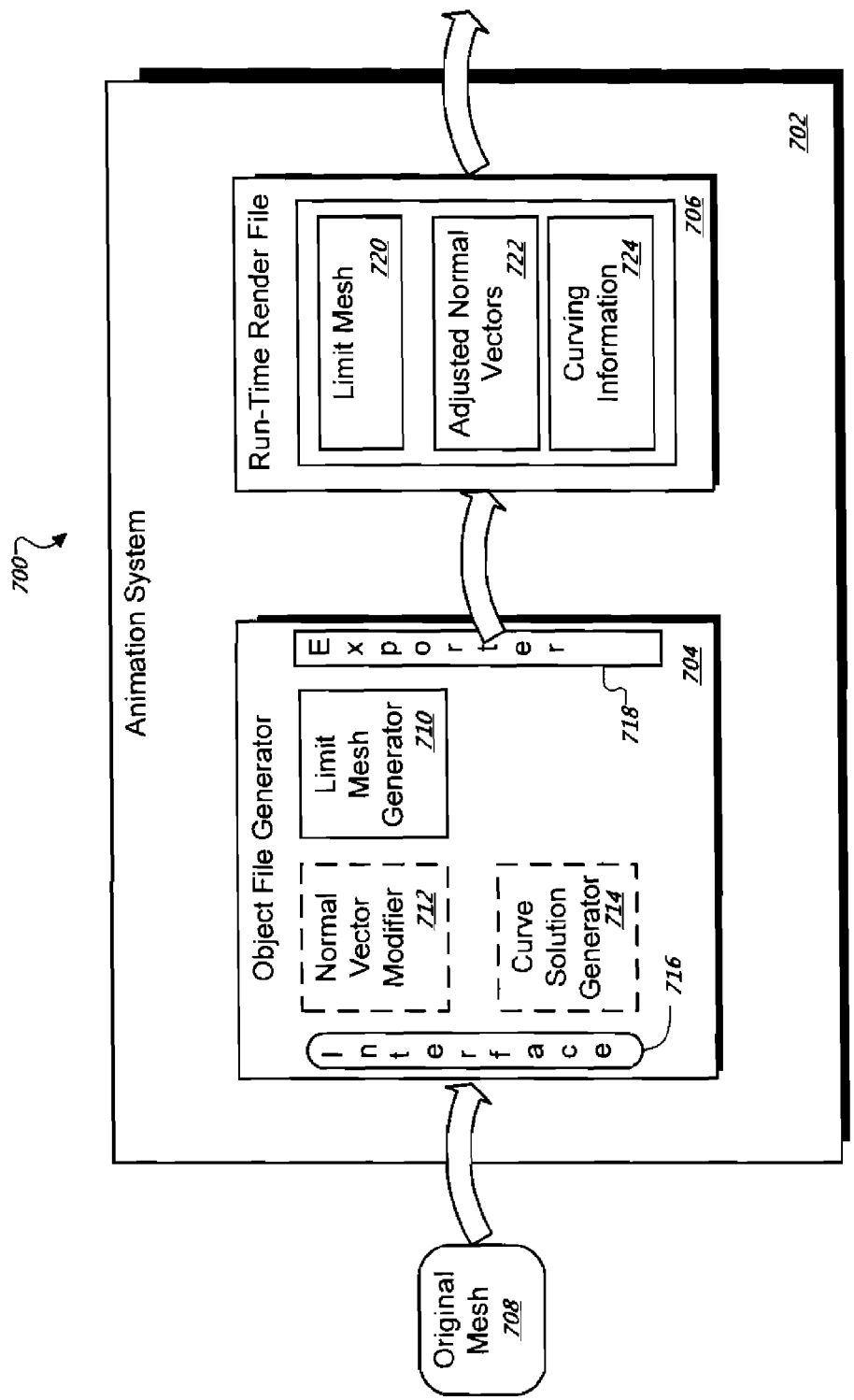
FIG. 7 is a schematic diagram illustrating an example system that can generate a game-ready run-time file.

FIG. 7 is a schematic diagram illustrating an example system 700 that can generate a file used to render an object. An animation system 702 can be implemented on various operating systems and computer architectures. The animation system 702 includes an object file generator 704 and at least one run-time render file 706. The animation system 702 can receive an original mesh 708 and use the included object file generator 704 to generate a run-time render file 706 for the original mesh 708.

The object file generator 704 includes a limit mesh generator 710 and optionally includes a normal vector modifier 712 and a curve solution generator 714. The limit mesh generator 710 can use the received original mesh 708 to calculate vertex locations for the limit mesh using the vertex locations of the original mesh 708. For example, the limit mesh generator 710 can compute the vertex locations of the limit mesh using the algorithm previously described in connection with FIG. 1B.

The normal vector modifier 712 can modify the normal vectors received from the original mesh so that they represent normals associated with the limit mesh. For example, the normal vector modifier 712 can compute the modifications to the normal vectors of the original mesh as previously described in connection with FIG. 2.

The curve solution generator 714 can use the limit mesh generated by the limit mesh generator 710 and can apply an artist selectable curving solution to the limit mesh. For example, the curve solution generator 714 can determine a curve solution that causes the limit mesh to better approximate the shape of the object, as previously described in connection with FIGS. 3A and 3B.

The interface 716 can be used to import the original mesh 708, or capture user input (e.g., curve solution selection, limit mesh modifications, export requests, etc.) from modules 710, 712, and 714. The interface can include graphical user components (e.g., a graphical user interface), or can be a file-based interface (e.g., a file importer). The modules 710, 712, and 714 can also use an exporter 718 to export their information. The exporter 718 can export information to a run-time render file 706. For example, the run-time render file described in connection with FIG. 4A or 4B.

The run-time render file includes limit mesh information 720, adjusted normal vectors 722, and curve solution information 724. The limit mesh information 720 can specify the position, color, and texture mapping information for the limit mesh. The adjusted normal vectors can specify the effects of influences on the limit mesh, such as the effects of light (e.g., reflections, shadows, refractions) for the limit mesh. The curving solution information 724 specifies the curving solution that is applied to the limit mesh as an in-game camera view is changed. As previously described in connection with FIG. 5, the run-time render file can be converted into a platform specific file that can be used to specify the original mesh as a limit mesh with curve information.

Figure 8:
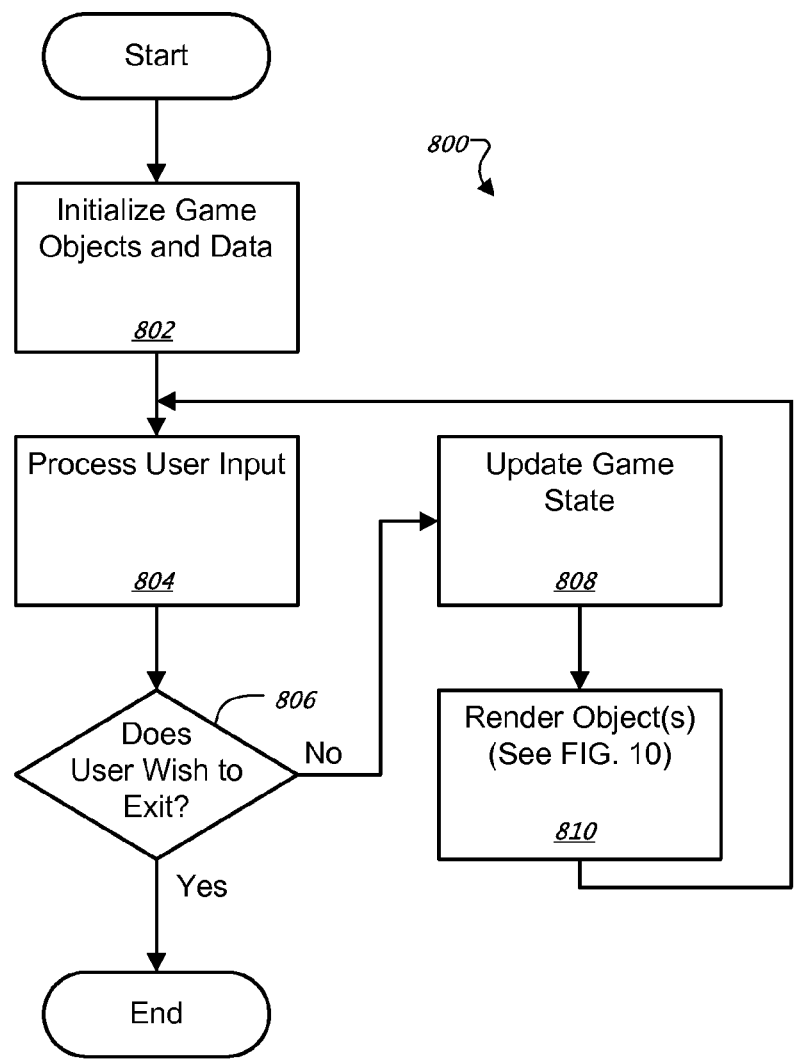
FIG. 8 is a flow chart illustrating an example method for executing a game.

FIG. 8 is a flow chart illustrating an example method 800 for executing a game. The method can be executed on a variety of systems, such as a personal computer or a console system developed by SONY, MICROSOFT, and NINTENDO (Kyoto, Japan).

In box 802, the system initializes the game with the run-time file created by the animation system 700. The initialization can include loading objects (e.g., meshes) into memory, setting the game environment to a default state, and connecting to a game server over the internet.

In box 804, the initialized system receives user input. For example, a user may make selections to manipulate objects in the game (e.g., fight other characters, navigate vehicles, etc.) The input can come from a variety of user input devices including a mouse, a keyboard, a stylus, an analog controller, etc.

In step 806, the system determines if the user input requests the game to terminate. If the system determines that the user would like to exit, the system terminates the game and ends execution. Otherwise, the user input is used to update the game state.

In box 808, the system updates the game state based on user input. For example, if the user input generates a movement of an animated character from a location A to a location B the system can update the character's position based on this movement. The updated character's position can be used by the game's artificial intelligence to help determine a course of action (e.g., where characters controlled by the game should move, if the player movement triggers an in-game event, etc.). As another example, the user input can define a camera manipulation (e.g., a zoom, a rotation, or a translation of an object, such as the user-controlled character, in the game environment). Manipulating the camera can change how the objects in view are rendered, as described in more detail in connection with FIG. 10.

In box 810, the system can render the updated game state, such as updating a character's position, generating a cut scene, etc. Rendering is described in more in association with FIG. 10.

Figure 9A:
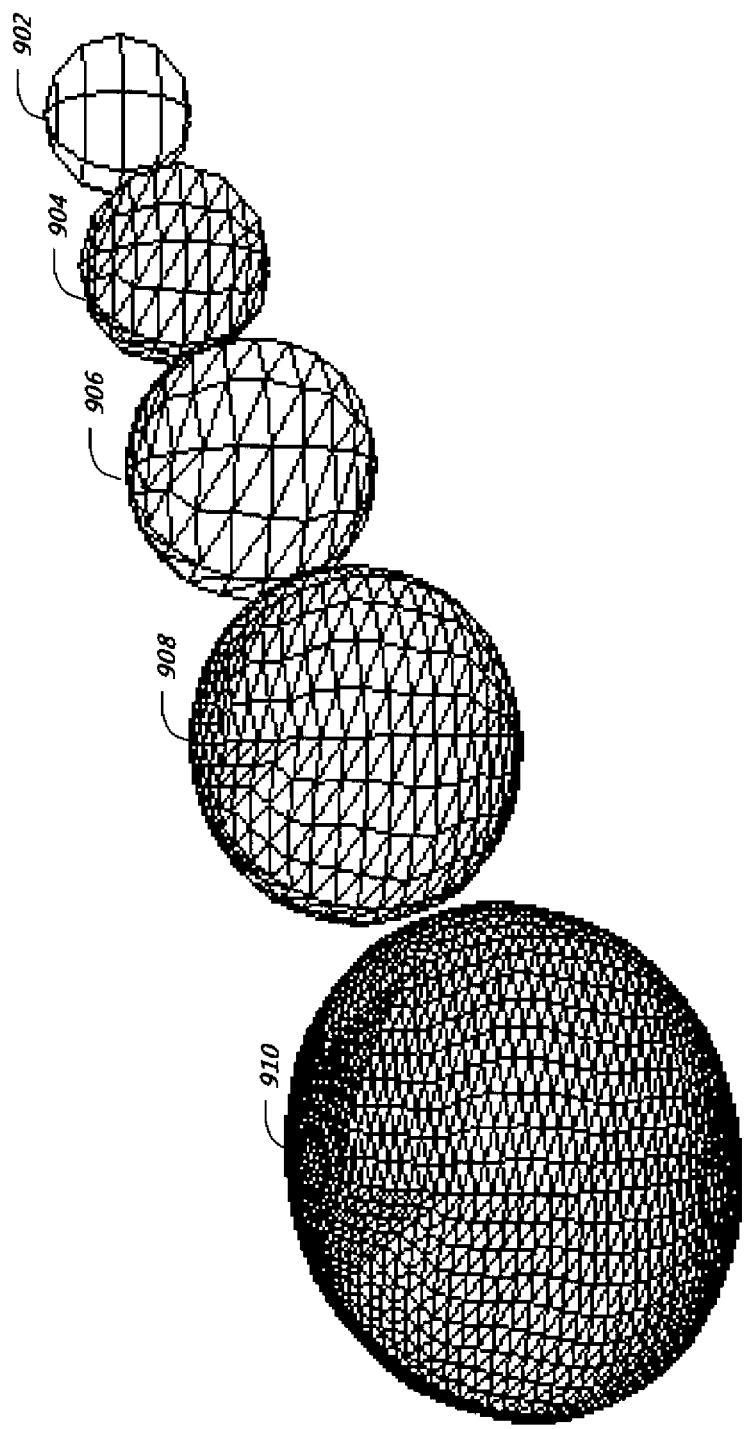
FIG. 9A is a schematic diagram illustrating example objects at various levels of detail using game-ready curve information contained in the run-time file.

FIG. 9A is a schematic diagram illustrating an example object at various levels of detail using curve information contained in a run-time file. Spheres 902, 904, 906, 908, and 910 represent the same object as a camera is moved closer to the object.

For example, the sphere 902 represents the sphere as a limit mesh without the application of a curve solution. As the camera is moved closer to the object, a coarse representation of the curve solution is applied to the limit mesh generating, in real-time, the sphere 904. As the camera continues to move closer to the object, the curve solution can be refined in real-time, producing spheres, 906, 908, and ultimately the approximation of the limit surface, sphere 910.

FIG. 9B is a schematic diagram illustrating an example low detail representation of an object. The object 912 is a profile view of a portion of a limit mesh representing the object. As the camera moves closer to the object, the limit mesh can be modified to include more polygons for example, as described in connection with FIGS. 9C and 9D.

FIG. 9C is a schematic diagram illustrating an example transition between intermediate resolutions using a curve flattening technique. Once the camera has moved within a predefined threshold, the limit mesh 912, can be modified using a flattened, coarse version of the real-time curve solution, represented by mesh 914. Because the mesh 914 uses a flattened version of the curving solution, a subtle transition between the limit mesh 912 and the flattened curve mesh 914 may be possible. As the object moves closer to the camera (e.g., because the object is moving towards the camera or the camera is moving towards the object) the flattening can be incrementally removed, resulting in various levels of curvature 916, 918, 920, and 922. In certain implementations, the number of triangles in the meshes 914-922 does not change as the flattening is removed. This may decrease perceptions of noticeable change to a viewer.

FIG. 9D is a schematic diagram illustrating an example transition from lower resolutions to high resolutions in the curve solution. As the camera moves closer to an object, the system can substantially continuously, and in real-time, increase the resolution of the curve solution. For example, the system can refine the curve solution to generate objects 924, 926, and 928. Increasing the resolution of the curve solution may yield an object 930, which closely resembles the desired subdivision surface.

Figure 10:
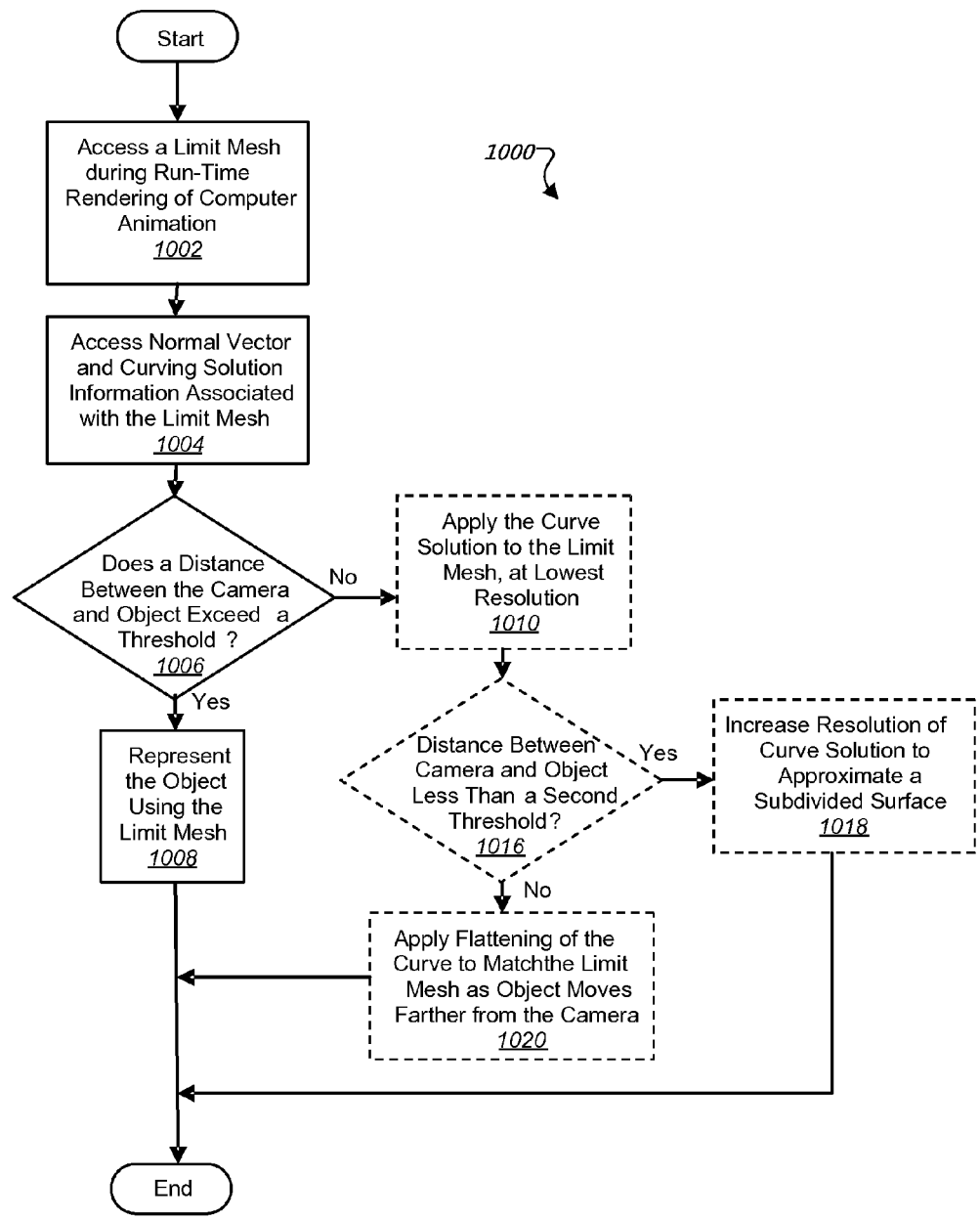
FIG. 10 is a flow chart illustrating an example rendering method using the game-ready run-time file.

FIG. 10 is a flow chart illustrating an example rendering method 1000 using a run-time file. As described previously in connection with FIG. 8, the method 1000 can be executed by a system during a game loop. In some implementations, the system may have been initialized with a run-time file that was specifically converted for the particular system's platform. In certain implementations, a curve level and flattening described below are evaluated frame by frame.

In box 1002, the system accesses a limit mesh during the run-time rendering of computer animation. As described previously in connection with FIGS. 5 and 7, the system can access the limit mesh as initially defined by a run-time file. The description for the limit mesh can be in memory, or the limit mesh description can be read from, for example, a hard drive.

In step 1004, the system can access the normal vector and curving solution information that is associated with the limit mesh. The normal vector and curving solution can be initially defined by a run-time file and can be stored in memory or read from persistent memory.

In step 1006, the system determines if the distance between the camera and the object to be rendered is greater than a predetermined first threshold. If the distance is greater, then as shown in step 1008, the object is represented using a limit mesh and the method 1000 ends.

In some implementations, the predetermined first threshold is based upon a user's perception of the object. For example, a user may perceive that a limit mesh of a medium sized object (e.g., a basketball) closely approximates an object when a virtual camera is positioned approximately thirty feet from the object in the virtual game environment.

Otherwise, in step 1010, the system can optionally apply the curve solution to the limit mesh at the lowest resolution.

In optional step 1016, a determination is made whether the distance between the virtual camera and the object is less than a second threshold. If the distance between the object is less than the predetermined second threshold, then in optional step 1018, the system can increase the resolution of the curve solution. As described in connection with FIG. 9D, as the camera moves closer to the object, the resolution of the curve solution can be increased until the mesh approximates a subdivided surface (e.g., a limit surface).

If the distance between the virtual camera and the object is not less than the predetermined second threshold, in optional step 1020, the system may flatten the associated curve solution so that is closer to (or substantially co-planar to) an outer surface of the limit mesh. At distances at and exceeding the first threshold distance (described in association with step 1006), the curve will be flattened completely, making it substantially co-planar to an outer surface of the limit mesh. At the second threshold distance (described in association with step 1016), the curve may not be flattened at all. This can permit a smooth transition between the limit mesh and the curve solution as illustrated, for example, by the mesh described in connection with FIG. 9C.

Thus, the game loop as described in connection with FIG. 8 can provide seamless transitions between resolution levels by iteratively executing the method 1000 as the camera moves to various distances from the object.

Figure 11:
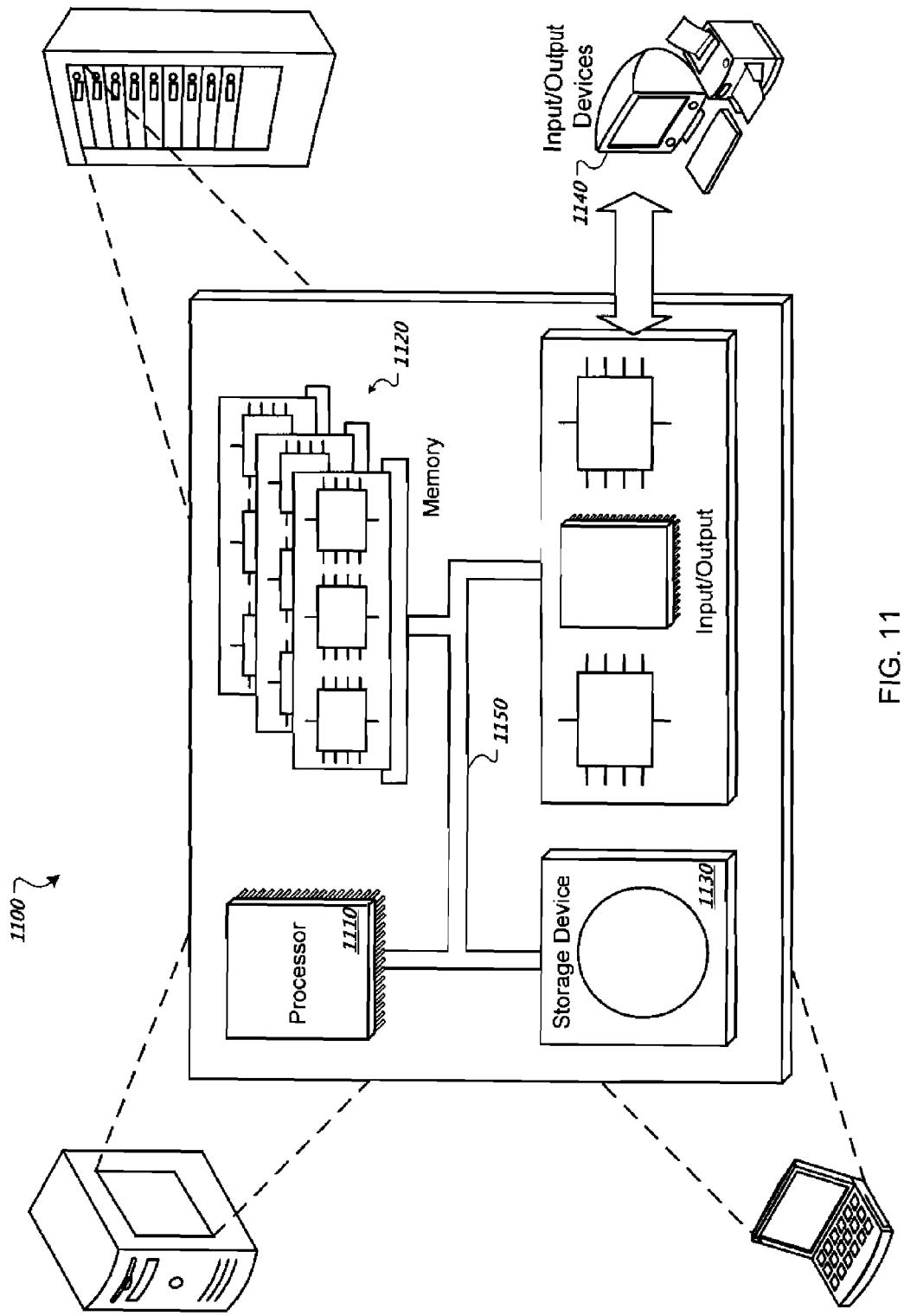
FIG. 11 is a schematic diagram illustrating a general computing system.

FIG. 11 is a schematic diagram illustrating a general computing system 1100. The system can be used for the operations described above according to certain implementations.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one embodiment, the processor 1110 is a single-threaded processor. In another embodiment, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one embodiment, the memory 1120 is a computer-readable medium. In one embodiment, the memory 1120 is a volatile memory unit. In another embodiment, the memory 1120 is a non-volatile memory unit.

The storage device 1130 is capable of providing mass storage for the system 1100. In one embodiment, the storage device 1130 is a computer-readable medium. In various different embodiments, the storage device 1130 may be a floppy disk device, a hard disk device, an optical disk device, or a tape device.

The input/output device 1140 provides input/output operations for the system 1100. In one embodiment, the input/output device 1140 includes a keyboard and/or pointing device. In one embodiment, the input/output device 1140 includes a display unit for displaying graphical user interfaces.

The described embodiments can be implemented in digital electronic circuitry, in computer hardware, firmware, software, or in combinations of them. Apparatus can be implemented in a computer program product tangibly embodied in an information carrier, e.g., in a machine-readable storage device or in a propagated signal, for execution by a programmable processor; and method steps of the described embodiments can be performed by a programmable processor executing a program of instructions to perform functions of the described embodiments by operating on input data and generating output. The described embodiments can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the described embodiments can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The described embodiments can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, more than one curve solution can be embedded in the run-time file, and the system can select the optimal curve solution based parameters, such as hardware configurations, game graphic settings, etc. For example, a curve solution yielding low resolution, medium resolution, and high result results can be embedded in the run-time file, and based on the game's graphic settings (e.g., low, medium or high) the appropriate curve solution can be applied to the limit mesh.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method of generating a model configured for real time approximation of an object, the method comprising:
   generating a limit mesh by positioning portions of an original mesh on a limit surface, wherein the original mesh represents an approximation of an object and a surface of the original mesh would converge to the limit surface were subdivisions to be performed on the original mesh until convergence;
   selecting for the limit mesh a first curving solution of multiple curving solutions, applying the first curving solution at a resolution to the limit mesh to obtain a modified limit mesh that has curves based on the curving solution, and displaying the modified limit mesh to a user, wherein each of the multiple curving solutions is configured to be applied to the limit mesh at multiple resolutions;
   receiving user approval for the modified limit mesh; and
   in response to the user approval, generating and storing a model to represent the object, the model including the limit mesh and information corresponding to the first curving solution, the model having a format accessible to a run-time rendering system configured for dynamically modifying the limit mesh in accordance with a viewpoint at run-time so that the limit mesh is used to represent the object above a threshold distance, and so that at and below the threshold distance respective resolutions are selected at which to apply the first curving solution to the limit mesh.

2. The method of claim 1, wherein generating the limit mesh comprises applying a Catmull-Clark limit surface equation to determine a position of the limit surface.

3. The method of claim 2, wherein the Catmull-Clark limit surface equation is applied to vertices of the original mesh to determine their position substantially near the limit surface.

4. The method of claim 2, wherein the Catmull-Clark limit surface equation is applied to a vertex of the original mesh having one or fewer creased edges to determine a limit surface position (LSP) for the vertex, the equation comprising $$LSP = \frac{(n \times n)V + 4\sum_{j=0}^{J} VN_j + \sum_{k=0}^{K} DAV_k}{n(n+5)}$$

where n is a number of faces sharing the vertex, V is a position of the vertex in the original mesh, VN is a position of a neighboring vertex to the vertex, J is a number of neighboring vertices, DAV is a position of a diagonal across-a-face vertex from the vertex, and K is a number of diagonal across-a-face vertices.

5. The method of claim 2, wherein the Catmull-Clark limit surface equation is applied to a vertex in the original mesh having two creased edges to determine a limit surface position (LSP) for the vertex, the equation comprising $$LSP = \frac{2}{3}V + \frac{1}{6}\sum_{j=0}^{J} VC_j$$

where V is a position of the vertex in the original mesh, VC is a position of a vertex at an end of a crease edge, and J is a number of vertices at the ends of the crease edges.

6. The method of claim 2, wherein the Catmull-Clark limit surface equation is applied to a vertex in the original mesh having three or more creased edges to determine a limit surface position (LSP) for the vertex, the equation comprises setting the LSP as substantially equal to a point on the limit surface.

7. The method of claim 1, wherein the portions of the original mesh comprise vertices.

8. The method of claim 1, further comprising receiving the selection of the curving solution from the user.

9. The method of claim 1, wherein the curving solution includes a point-normal (PN) triangle solution, a Patching Catmull-Clark mesh (PCCM) solution, or a Bezier patch mesh solution.

10. The method of claim 1, further comprising applying a limit surface normal algorithm to normal vectors used to determine effects of influences on the object, wherein the application of the limit surface normal algorithm modifies normal vectors corresponding with the original mesh so that the normal vectors correspond to the limit mesh.

11. The method of claim 10, wherein the influences on the object comprise simulated light.

12. The method of claim 1, further comprising dynamically modifying the limit mesh in accordance with the viewpoint at run-time, wherein the curves are flattened to be substantially co-planar to a surface of the limit mesh.

13. The method of claim 12, wherein dynamically modifying the limit mesh further comprises incrementally unflattening the curves as the viewpoint approaches the limit mesh.

14. The method of claim 12, wherein dynamically modifying the limit mesh comprises representing the object shape with the limit mesh having a coarse version of a curving solution applied to the limit mesh, the coarse version of the curving solution based on the information corresponding to the first curving solution.

15. The method of claim 12, wherein dynamically modifying the limit mesh further comprises applying a refined version of the curving solution to the limit mesh below the threshold distance.

16. A computer program product implemented in a computer readable storage device, the computer program product including instructions that when executed cause a processor to perform a method comprising:
generating a limit mesh by positioning portions of an original mesh on a limit surface, wherein the original mesh represents an approximation of an object and a surface of the original mesh would converge to the limit surface were subdivisions to be performed on the original mesh until convergence;
selecting for the limit mesh a first curving solution of multiple curving solutions, applying the first curving solution at a resolution to the limit mesh to obtain a modified limit mesh that has curves based on the curving solution, and displaying the modified limit mesh to a user, wherein each of the multiple curving solutions is configured to be applied to the limit mesh at multiple resolutions;
receiving user approval for the modified limit mesh; and
in response to the user approval, generating and storing a model to represent the object, the model including the limit mesh and information corresponding to the first curving solution, the model having a format accessible to a run-time rendering system configured for dynamically modifying the limit mesh in accordance with a viewpoint at run-time so that the limit mesh is used to represent the object above a threshold distance, and so that at and below the threshold distance respective resolutions are selected at which to apply the first curving solution to the limit mesh.

* * * * *